United States Patent Office 3,257,381
Patented June 21, 1966

3,257,381
METHOD OF PREPARING DIFLUORODIAZIRINE
Marion Douglas Meyers, Stamford, Conn., assignor to American Cyanamid Company, Stamford, Conn., a corporation of Maine
No Drawing. Filed May 11, 1962, Ser. No. 195,022
3 Claims. (Cl. 260—239)

This invention relates broadly to a method of isomerization. More particularly it relates to a new and unobvious method of preparing difluorodiazirine by isomerizing difluorocyanamide whereby yields of over 85%, based on the starting reactant, are obtained. The formula for difluorodiazirine is I 

Difluorodiazirine is the cyclic isomer of difluorodiazomethane.

The invention is based on my discovery that difluorosyanamide (1,1-difluorocyanamide, $F_2NC\equiv N$) can be converted into an isomer thereof, specifically difluorodiazirine, by bringing it into contact with anhydrous (substantially completely anhydrous) cesium fluoride, CsF. This was quite surprising and unexpected since no evidence of any such conversion or isomerization was found when a different alkali-metal fluoride, specifically rubidium fluoride (RbF), was substituted for CsF as the conversion catalyst.

I am unable to explain with certainty the manner in which a rearrangement occurs and difluorocyanamide (DFC) is converted into difluorodiazirine. One possible and logical explanation is that it involves fluoride ion catalysis, in which case the following scheme may be written for the reaction:

II 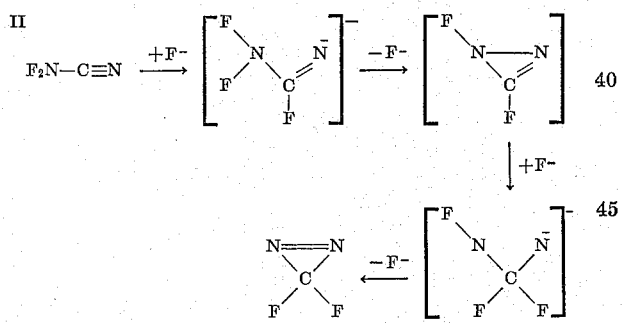

Any suitable means can be employed in bringing the DFC, which has a boiling point of about −63° C. to −69° C., into contact with the anhydrous CsF. Preferably the reaction is carried out mainly or entirely while the DFC is in the gaseous state, i.e., at a temperature above its aforementioned boiling point. Good results have been obtained by bringing the DFC into contact with the CsF while the former is in liquid state and then allowing it to reach ambient temperature (room temperature), e.g., 20-30° C., or even about 40° C.

The gaseous DFC can be passed upwardly or downwardly through a bed of the CsF catalyst. Or, it may be passed through a plurality of inlet ports or openings whereby the gaseous reactant is introduced at a plurality of points into a bed of the catalyst contained in an isomerization reactor, and the isomerization product, difluorodiazirine, is withdrawn from the reactor along with any unconverted DFC. The reaction can be carried out continuously, semi-continuously or by batch technique, and at atmospheric or superatmospheric pressure.

The CsF catalyst may be of any suitable size or shape, for example in finely divided state such as of from 50 to 100 mesh fineness; or in the form of larger particles (coarser than 50 mesh), beads, pellets, etc.

The time of contact of the difluorocyanamide with the CsF catalyst can be varied as desired or as conditions may require depending, for example, upon such influencing factors as, for example, the design of the reactor; whether or not the operation is continuous, semi-continuous or batch; the size, shape, surface area, etc., of the catalyst; temperature and/or pressure at which the reaction is effected; and other influencing conditions. For example, when the reaction is carried out continuosly with the DFC in the gaseous state the time of contact may be from less than a minute (e.g., about ¼ minute) to 10 or 15 minutes or more. On the other hand, in batch operations the contact time may range, for instance, from ½ hour to 4 or 5 hours, or even 6 hours or more.

The CsF catalyst, for optimum results, should be in anhydrous (substantially completely anhydrous) state. By "anhydrous" alone or "substantially completely anhydrous" as used herein and in the appended claims with reference to cesium fluoride catalyst is meant one which contains no more than a trace of water or the amount of water that might be present in the commercial product. The amount of water should not be such as would adversely affect the course of the reaction or the constitution of the reaction product.

Difluorocyanamide (1,1-difluorocyanamide) can be prepared by various methods, e.g., by the fluid-bed fluorination of biguanide as is more fully described and broadly and specifically claimed in the copending application of Simon Frank, M. Douglas Meyers and Scott W. Grant, Serial No. 195,023, filed concurrently herewith; or by the fluorination of an aqueous cyanamide ($H_2NC\equiv N$) solution as is more fully described and broadly and specifically claimed in the copending application of the aforementioned Frank, Meyers and Grant, Serial No. 195,024, also filed concurrently herewith. Both of these copending applications are assigned to the same assignee as the present invention.

In order that those skilled in the art may better understand how the present invention can be carried into effect, the following example is given by way of illustration and not by way of limitation. All percentages are by weight.

EXAMPLE

A glass reactor of 10 cc. capacity was charged with 1 g. of anhydrous CsF of from about 50 to 100 mesh (U.S. Standard siever series) fineness.

This reactor was then evacuated, filled with difluorocyanamide (0.1 mmole) to a calculated pressure of 200 mm., and allowed to stand for 75 minutes at room temperature (20°-30° C.).

At the end of this period of time the total pressure in the reactor was about 185 mm. The amount of non-condensables at −196° C. was less than 0.01 mmole (calculated from a pressure of less than 10 mm.). Infrared examination of the product showed only bands for difluorodiazirine. Fractional co-distillation [reference: G. H. Cady and D. P. Siegworth, Anal. Chem. 31, 618 (1959)] confirmed the presence of a single major component, viz., difluorodiazirine. The yield was more than 85%, more particularly about 88%, of the theoretical yield based on the amount of starting difluorocyanamide employed.

Difluorodiazirine is useful as an intermediate in chemical synthesis, for example as a source of difluorocarbene radicals, $:CF_2$.

I claim:
1. The method of preparing difluorodiazirine which comprises isomerizing 1,1-difluorocyanamide by bringing it into contact with an isomerization catalyst comprising anhydrous cesium fluoride.

2. The method of preparing difluorodiazirine which comprises isomerizing 1,1-difluorocyanamide in gaseous state by bringing it into contact with anhydrous cesium fluoride.

3. The method of preparing difluorodiazirine which comprises isomerizing 1,1-difluorocyanamide by bringing gaseous 1,1-difluorocyanamide into contact with anhydrous cesium fluoride, the reaction mass being at a temperature ranging from the boiling point of 1,1-difluorocyanamide to ambient temperature during the reaction period.

No references cited.

HENRY R. JILES, *Acting Primary Examiner.*

CARL D. QUARFORTH, L. A. SEBASTIAN,
*Examiners.*